United States Patent Office 3,214,325
Patented Oct. 26, 1965

3,214,325
PROCESS OF SIZING PAPER WITH A
HALO-SYM-TRIAZINE
Van R. Gaertner, Ballwin, Mo., assignor to Monsanto
Company, a corporation of Delaware
No Drawing. Filed May 7, 1962, Ser. No. 192,986
3 Claims. (Cl. 162—158)

This invention relates to organic ring compounds containing nitrogen and chlorine, and more particularly relates to halogenated symmetrical triazine compounds with halogen-containing hydrocarbon and halogen-containing hydrocarbon ether groups as substituents therein, and to sizing compositions containing said compounds as an active ingredient therein.

An object of this invention is to provide (halohydrocarbyloxy)-sym-triazines as new compounds. A further object of this invention is to provide (halohydrocarbyloxy)-sym-triazines containing halogen atoms on carbon atoms of the triazine ring. Another object of this invention is to provide a method for preparing (halohydrocarbyloxy)-sym-triazines having halogen atoms bonded to the ring carbon atoms. Still another object of this invention is to provide sizing compositions containing (halohydrocarbyloxy) - sym - triazines as active constituents thereof.

Other objects, advantages, and aspects of this invention will appear from the description hereinafter.

According to this invention I have found and prepared new compounds having a general formula selected from the group consisting of

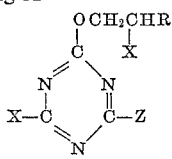

and

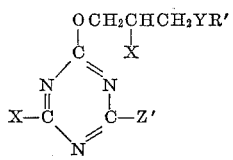

wherein R is selected from the group consisting of hydrogen, alkyl radicals having from 1 to 22 carbon atoms, aryl radicals having from 6 to 12 carbon atoms, and aralkyl and alkaryl radicals having from 7 to 24 carbon atoms; Y is a chalkogen element having an atomic weight from 16 to 33, that is, oxygen and sulfur (see Hackh's Chemical Dictionary, third edition, 1953, pages 185), R' is selected from the group consisting of alkyl radicals of from 1 to 22 carbon atoms, aryl radicals having 6 to 12 carbon atoms, and alkaryl radicals and aralkyl radicals having from 7 to 24 carbon atoms, X is a halogen, preferably chlorine or bromine; Z is selected from the group consisting of X, and the radical

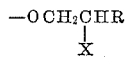

wherein X and R are as above defined; Z' is selected from the group consisting of X and the radical

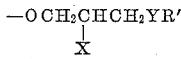

wherein X, Y and R' are as above defined.

The preferred compounds of this invention are those having one radical of the type

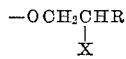

or

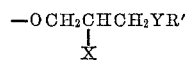

attached to one of the carbon atoms of the symmetrical triazine ring. The number of such radicals on the carbon atoms of the triazine ring can be varied from one to two so that when there is present only one such radical bonded to carbon there will be a halogen atom linked to each of the remaining 2 carbon atoms of the triazine ring. Likewise, when two such radicals are linked to the carbon atoms of the triazine ring there will be one halogen atom linked to the remaining carbon atom of the triazine ring. In preparing the halohydrocarbyloxy halogen-substituted symmetrical triazines of this invention a cyanuryl halide, that is, a compound of the formula

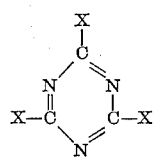

wherein X is as above defined, is reacted with an epoxide having a formula selected from the group consisting of

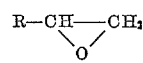

and

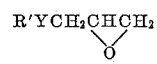

wherein R, R', and Y are as above defined, in sufficient quantity to replace at least one but not more than 2 of the halogen atoms linked to the carbon atoms of the triazine ring with the respective halohydrocarbyloxyl radicals derived from the respective epoxides used. For example by reacting 2,4,6-trichloro-sym-triazine with sufficient propylene oxide to react with and replace one chlorine atom, there is obtained as product, 2,4-dichloro-6-(2-chloropropoxy)-sym-triazine. Similarly by reacting 2,4,6-tribromo-sym-triazine with 1 molar equivalent of 3-octadecyloxy-1,2-epoxypropane there is obtained as product 2,4 - dibromo - 6 - (2 - chloro-3-octadecyloxypropoxy)-sym-triazine.

In preparing compounds within the scope of this invention the cyanuryl halide is reacted with a sufficient amount of an epoxide to replace from 1 to 2 halogen atoms from the carbon atoms of the triazine ring; preferably on the average of one such halogen is replaced by reaction with the epoxide when the compounds are intended for use in reactive sizing compositions, that is, in sizing compositions wherein the active ingredient of said composition chemically reacts with the substrate to impart sizing qualities thereto and become a part of the substrate's chemical structure.

It is also within the scope of this invention to replace two halogen atoms in the trihalo-sym-triazine with two different halohydrocarbyloxyl radicals by replacing the halogens one at a time, as above, with two different epoxide reactants. Thus by following the route indicated in the above paragraph and replacing one halogen atom by reacting one mole of an epoxide with one mole of the trihalo-sym-triazine, and then adding an additional mole of a different epoxide compound to replace a second halogen atom, the reaction products can be varied extensively. For example by reacting 2,4,6-trichloro-sym-triazine with one mole of 1,2-butylene oxide until reaction is complete, and then with 1 mole of epichlorohydrin, 2-chloro-4-(2 - chlorobutoxy) - 6(2,3 - dichloropropoxy)-sym-triazine can be obtained.

Examples of cyanuryl halide reactants, that is, halogenated sym-triazines which can be used in the process of this invention are, for example, 2,4,6-trichloro-sym-triazine, 2,4,6-tribromo-sym-triazine, and mixed chlorobromo-sym-triazines such as 2-chloro-4,6-dibromo-sym-triazine.

One type of epoxide that may be used to prepare the compounds of this invention is glycidyl ethers of the formula

wherein R' and Y are as above defined. Examples of such compounds are those wherein R' is an alkyl, aryl, alkaryl or aralkyl radical having a total of up to 24 carbon atoms in either a straight chain or branch chain arrangement. Illustrative examples of some alkyl radicals include the methyl, ethyl, propyl, isopropyl, butyl, amyl, hexyl, 2-methylhexyl, heptyl, octyl, 2-ethylhexyl, isononyl, n-dodecyl, tert-dodecyl, 2-propylheptyl, 5-ethylnonyl, 2-butyloctyl, n-tetradecyl, n-pentadecyl, tert-octadecyl, eicosyl, docosyl, tetracosyl, 2,6,8-trimethylnonyl, and 7-ethyl-2-methyl-4-undecyl radicals. An especially valuable class of alkyl radicals is that derived from an olefin monomer, dimer, trimer, tetramer, pentamer or the like, carbon monoxide, and hydrogen according to the "oxo" process. Such alkyl radicals include branch-chained tridecyl radicals from propylene tetramer or butylene trimer, the branch-chain decyl radicals derived from propylene trimer, the branch-chained hexadecyl radicals derived from propylene pentamer, and the branch-chained nonyl radical derived from diisobutylene. Aryl radicals include phenyl, tolyl, naphthyl, biphenylyl, etc. The alkaryl radicals can include the monoalkylated as well as the polyalkylated aryl radicals. The monocyclic and dicyclic aryl radicals are preferred. Illustrative examples of some radicals which can be used include tolyl, benzyl, dimethylphenyl, 2-phenylethyl, propylphenyl, tert-octylphenyl, naphthylmethyl, amylphenyl, heptylphenyl, nonylphenyl, 2-ethylheptylphenyl, decylphenyl, 4 - tert - dodecylphenyl, 2-tridecylphenyl, 3-tert-octadecylphenyl, 2-nonyl-1-naphthyl, beta-1-(2-butyloctyl)-2-naphthyl, 3-butylphenyl, and 2,4-dinonylphenyl radicals.

Illustrative examples of some glycidyl ethers which can be used as the ether reactants in the process of this invention are as follows:

3-methoxy-1,2-epoxypropane
3-propoxy-1,2-epoxypropane
3-hexyloxy-1,2-epoxypropane
3-heptyloxy-1,2-epoxypropane
3-decyloxy-1,2-epoxypropane
3-(dimethylphenoxy)-1,2-epoxypropane
3-(tert-octadecyloxy)-1,2-epoxypropane
3-(nonylphenoxy)-1,2-epoxypropane
3-(2-propylheptyloxy)-1,2-epoxypropane
3-(n-hexadecyloxy)-1,2-epoxypropane
3-(2,4-dinonylphenoxy)-1,2-epoxypropane
3-(n-octadecyloxy)-1,2-epoxypropane
3-(decylphenoxy)-1,2-epoxypropane
3-(tridecyloxy)-1,2-epoxypropane
3-(2-nonyl-1-naphthoxy)-1,2-epoxypropane Illustrative examples of some of the glycidyl thioethers which can be used as the ether reactant in the process of this invention are as follows:

3-methylthio-1,2-epoxypropane
3-ethylthio-1,2-epoxypropane
3-butylthio-1,2-epoxypropane
3-octylthio-1,2-epoxypropane
3-nonylthio-1,2-epoxypropane
3-(n-hexadecylthio)-1,2-epoxypropane
3-(2,4-dinonylphenylthio)-1,2-epoxypropane
3-(n-octadecylthio)-1,2-epoxypropane
3-(2-butyloctylthio)-1,2-epoxypropane
3-(tridecylthio)-1,2-epoxypropane
3-[(2-ethylheptyl)phenylthio]-1,2-epoxypropane
3-(n-pentadecylthio)-1,2-epoxypropane
3-(3-butylphenylthio)-1,2-epoxypropane The glycidyl ether and thioether reactants used in the process of this invention can be readily prepared from the corresponding chlorohydrins, e.g., 1-alkoxy-3-chloro-2-propanol, 1-alkaryloxy-3-chloro-2-propanol, 1-alkylthio-3-chloro-2-propanol, and 1-alkarylthio-3-chloro-2-propanol. The chlorohydrin is dehydrochlorinated in an aqueous alkaline solution, preferably in the presence of a lower dialkylsulfoxide. The chlorohydrin can be readily prepared from a long-chain alcohol and epichlorohydrin by reacting substantially 1 mole each of the alcohol and epichlorohydrin in the presence of an acid-type catalyst such as boron trifluoride, zinc chloride, etc.

Some examples of epoxide or oxirane compounds that are suitable for reaction with the 2,4,6-trihalosym-triazine compound are for example, ethylene oxide, and alkyl derivatives thereof such as propylene oxide, isobutylene oxide, 1,2-epoxybutane, 2,3-epoxybutane, 1,2-epoxypentane, 2,3 - epoxypentane, 2,3 - epoxyhexane, 1,2 - epoxyhexane, 1,2-epoxyheptane, 2,3-epoxy-3-ethylpentane, 1,2-epoxy-4-methylpentane, 1,2-epoxy-2-ethylhexane, 1,2-epoxy-2,4-trimethylpentane, 1,2-epoxy-2,3-dimethylheptane; haloalkyl-substituted alkylene oxides such as epichlorohydrin, epibromohydrin, epiiodohydrin, epifluorohydrin, 1,2-epoxy-4-bromobutane, 2,3-epoxy-4-bromobutane, 1,2-epoxy-3,4-dibromobutane, 2,3-epoxy-1-bromopentane, 3,4-epoxy-2-chlorohexane, 1,2 - epoxy-3,3,3-trifluoropropane; the alkenyl-substituted oxide rings such as 3,4-epoxy-4-methyl-1-pentene, 1,2-epoxy-3-butene and 3,4-epoxy-1-butene; aryl-substituted alkylene oxide rings such as (epoxyethyl)benzene, (1,2-epoxy - 1 - methylethyl)benzene, (3-chloro-1,2-epoxypropyl)benzene; 1,2-epoxytridecane, 1,2-epoxytetradecane, 1,2-epoxyhexadecane, 1,2-epoxyoctadecane, 1,2-epoxyeicosane, 1,2-epoxy-3-cyclohexylpropane, 1,2-epoxy-3-cyclobutylpropane, 1,2-epoxy-4-(4-n-octyl-3-cyclohexenyl)butane, 1,2-epoxyhenecosane, 1,2-epoxydocosane, 1,2-epoxytetracosane, 1,2-epoxypentacosane, and 1,2-epoxyhexacosane.

Example of products obtained by reacting a cyanuryl trihalide with one of the above identified epoxide compounds to replace one halogen atom in the triazine ring are:

2,4 - dibromo-6-(2,3 - dichloropropoxy)-sym-triazine obtained by reacting 2,4,6-tribromo-sym-triazine with epichlorohydrin;
2,4-dichloro-6-(2-chloroethoxy)sym-triazine obtained by reacting 2,4,6-trichloro-sym-triazine with ethylene oxide;
2,4-dibromo-6-(2 - bromooctyloxy)-sym-triazine obtained by reacting 2,4,6-tribromo-sym-triazine with 1,2-epoxyoctane;
2,4 - dichloro-6-(2 - chlorooctadecyloxy)-sym-triazine obtained by reacting 2,4,6-trichloro-sym-triazine with 1,2-epoxyoctadecane;
2,4 - dibromo-6-(2 - bromodocosyloxy)-sym-triazine obtained by reacting 2,4,6-tribromo-sym-triazine with 1,2-epoxydocosane;
2,4-dichloro-6-(2-chloro-2-phenylethoxy)-sym-triazine obtained by reacting 2,4,6-trichloro-sym-triazine with epoxyethylbenzene;
2,4 - dibromo-6-(2 - bromo-3-naphthylpropoxy)-sym-triazine obtained by reacting 2,4,6-tribromo-sym-triazine with 1,2-epoxy-3-naphthylpropane; and
2,4 - dichloro-6-(2 - chloro-3-biphenylylpropoxy)-sym-triazine obtained by reacting 2,4,6-trichloro-sym-triazine with 1,2-epoxy-3-biphenylylpropane.

Examples of products obtained by reacting a trihalo-sym-triazine with a sufficient amount of an epoxide to react with and replace two halogen atoms therefrom are:

2-chloro-4,6-bis(2 - chloropropoxy)-sym-triazine obtained by reacting 2,4,6-trichloro-sym-triazine with 1,2-epoxypropane;

2-bromo - 4,6 - bis-(2-bromododecyloxy)-sym-triazine obtained by reacting 2,4,6-tribromo-sym-triazine with 1,2-epoxydodecane;

2-chloro-4,6-bis(2 - chlorooctadecyloxy)-sym-triazine obtained by reacting 2,4,6-trichloro-sym-triazine with 1,2-epoxyoctadecane; and 2-bromo-4,6-bis(2 - bromotetracosyloxy)-sym-triazine obtained by reacting 2,4,6-tribromo-sym-triazine with 1,2-epoxytetracosane.

Examples of products obtained by reacting a 2,4,6-trihalo-sym-triazine with a glycidyl ether include:

2,4 - dichloro-6-(2 - chloro-3-ethoxypropoxy)-sym-triazine obtained by reacting 2,4,6-trichloro-sym-triazine with 1,2-epoxy-3-ethoxypropane;

2,4 - dibromo-6-(2 - bromo-3-hexadecyloxypropoxy)-sym-triazine obtained by reacting 2,4,6-tribromo-sym-triazine with 1,2-epoxy-3-hexadecyloxypropane;

2,4 - dichloro-6-(2 - chloro-3-phenoxypropoxy)-sym-triazine obtained by reacting 2,4,6-trichloro-sym-triazine with 1,2-epoxy-3-phenoxypropane;

2 - bromo - 4,6 - bis(2-bromo-3-tricosyloxypropoxy)-sym-triazine obtained by reacting 2,4,6-tribromo-sym-triazine with 1,2-epoxy-3-tricosyloxypropane;

2 - chloro - 4,6 - bis(2-chloro-3-isopropoxypropoxy)-sym-triazine obtained by reacting 2,4,6-trichloro-sym-triazine with 1,2-epoxy-3-isopropoxypropane; and 2-chloro - 4,6 - bis(2-bromo-3-naphthyloxypropoxy)-sym-triazine obtained by reacting 2-chloro-4,6-dibromo-sym-triazine with 1,2-epoxy-3-naphthyloxy propane.

As above indicated, it is within the realm of this invention to prepare derivatives of halotriazine compounds in which a different halohydrocarbyloxy group is attached to each of two carbon atoms of the triazine ring so substituted. Examples of such compounds are:

2 - chloro - 4 - (2 - chloro - 3 - bromopropoxy) - 6 - (2-chloro-3-phenoxypropoxy)-sym-triazine obtained by reacting 2,4,6-trichloro-sym-triazine with epibromohydrin and then with 1,2-epoxy-3-phenoxypropane;

2 - bromo - 4 - (2 - bromooctadecyloxy) - 6 - (2 - bromopropoxy)-sym-triazine obtained by reacting 2,4,6-tribromo-sym-triazine with 1,2-epoxyoctadecane and then with propylene oxide; and 2 - chloro - 4 - (2 - chloro - 2 - ethylhexyloxy) - 6 - (2-chloro-3-hexyloxypropoxy)-sym-triazine obtained by reacting 2,4,6-trichloro-sym-triazine with 1,2-epoxy-2 ethylhexane and then with 1,2-epoxy-3-hexyloxypropane.

The halohydrocarbyloxyl symmetrical triazine compounds of the above defined types having 1 or 2 halogen atoms still attached to the carbon atoms of the triazine ring are recovered as such and used in sizing compositions.

The reaction of the epoxyalkane or glycidyl ether reactant with the cyanuryl trichloride or tribromide takes place readily by contacting either reactant with the cyanuryl trihalide in an appropriate solvent or diluent which will not react with either of the reactants and is a good solvent for both, advantageously in the presence of a catalyst, and then stirring the resulting reaction mixture until the desired product has been formed. Although reaction may take place slowly at temperatures as low as 25° C., ordinarily a temperature of about 50 to 80° C. is used to carry out the reaction. Preferably the temperature is maintained below 150° C. and usually below 125° C. since the more elevated temperatures appear to cause decomposition of the products. Any solvent or diluent which has a convenient boiling point at the temperature of reaction and which will not react with either of the reactants can be used. Such solvents or diluents are for example acetonitrile, tetrahydrofuran, dioxane, ether, and hydrocarbon solvents such as xylene, toluene, hexane, and the like.

Ordinarily, the reaction of this invention is conducted at atmospheric pressures while superatmospheric pressures can be used and in fact, may be necessary in systems wherein lower molecular weight epoxide compounds are used.

The epoxyalkane or the glycidyl ether reactants and the cyanuryl trihalide reactants are preferably reacted in approximately stochiometric proportions; however, care is taken to insure that not more than 2 molar equivalents of the epoxyalkane or glycidyl ether reactant is used per mole of the cyanuryl trihalide reactant since it is desirable to leave at least one and preferably two halogen atoms bonded to the carbon atoms of the triazine nucleus when the products are to be used in sizing compositions.

The reaction of the epoxyalkane or the glycidyl ether reactant with the cyanuryl trihalide is primarily an addition type reaction resulting in the formation of a single product. The substituted halotriazine product is usually recovered from the reaction mixture by first removing the unconverted reactants and by-products by distillation under reduced pressure, filtration, solvent extraction, etc., and then purifying the residue. Conventional purification techniques including serial redissolving the residue in the solvent, decolorizing the mixture with charcoal, filtering the mixture, and allowing the product to crystallize or aspirating off the solvent and possibly distilling the product in vacuo.

The epoxy compounds and the glycidyl ethers react with the cyanuryl trihalide reactants with comparative ease. The mixture is usually heated to a higher temperature on the order of 80 to 130° C. to insure complete reaction, but such heating is not necessary where is evident by well known chemical means that the reaction is complete. The higher reaction temperatures are generally used to promote reaction of materials of higher molecular weight.

The reaction of the epoxyalkane and glycidyl ether reactants with the cyanuryl trihalide reactants is generally conducted in the presence of an appropriate catalyst. The use of catalyst is preferred in that reaction time is thereby substantially decreased, use of a lower reaction temperature is facilitated, and yields of the desired product are materially improved. As catalyst there may be employed such compounds as titanium tetrachloride, zirconium tetrachloride, aluminum chloride, ferric chloride, boron trifluoride, tin tetrachloride, and zinc chloride.

The compounds of the present invention are stable, usually high boiling materials which range from viscous liquids to waxy or crystalline solids. They are particularly valuable as an essential active ingredient in sizing compositions for treating of paper products which include cardboard and other thicker papers made from one or more plies of paper stock. They are also active as biological toxicants, particularly as herbicides.

In the manufacture of paper, the selected raw cellulosic material is subjected to cleansing, boiling, washing, bleaching, and beating or reducing to pulp. The pulp comprises a dilute suspension of beaten cellulosic fibers, and paper is formed therefrom by draining most of the water therefrom and drying the resultant wet mat of entangled fibers until essentially water-free. A commonly used process for sheeting the pulp comprises flowing the dilute suspension of beaten cellulosic fibers onto a screen from which the water is drained, and thereafter passing the resultant wet mat of entangled fibers over and between drying rolls until essentially water-free.

Paper made by the aforementioned process is known in the art as water-leaf paper. It quite readily absorbs water, possesses little or no strength when water wet, and has other properties which materially limit its use. In order to extend the field of use, various materials are commonly incorporated with the cellulosic fibers either before or after the web or sheet is formed to produce or improve certain desirable properties. For example, rosin or animal glue have been employed to impart water resistance, clay to improve printing properties, plasticizers to enhance softness, and starch to improve the dry strength of paper. Such papers, however, do not have a high wet strength which is highly desirable for a number of various uses.

Paper has also been coated with various water resisting compositions. Due to the coating, the water absorbency of the paper has been reduced to a minimum and the product has a different appearance, feel and "hand" from uncoated papers.

The compounds of this invention having halohydrocarbyloxyl substituents having from 12 to 28 carbon atoms are useful as sizing agents for textiles, etc., but are particularly valuable as such for paper sizes since the substituted halotriazine compounds have pronounced hydrophobic properties. It is preferred for the application of these materials to fibrous products such as textiles, paper and paper pulp to utilize dispersing agents or wettting agents which may have the additional property of remaining in solution in the water without being absorbed by the fiber at least to a considerable extent during application.

Suitable dispersing agents to be used in combination with the presently provided sizing agents for the application thereof are the following: copolymers of styrene and maleic anhydride which have been converted to their water soluble salts, that is, sodium or ammonium salts; organic amine salts of alkyl aryl phosphinic acids; sodium glyceryl sulforicinoleate, butylhydroxydiphenyl sodium sulfonate, butyldiphenyl sodium sulfonate, dibutylhydroxydiphenyl disodium disulfonates, and ammonium and organic amine salts of fatty acids such as ammonium, triethanolamine and morpholine salts of oleic acid. The presently provided compounds may be added to the paper, paper pulp, etc. The preferred method for adding the substituted symmetrical halotriazine of this invention to the paper product is to incorporate it into the fluent pulp, especially alkaline pulps from which the paper sheet is to be formed. Accordingly, the halohydrocarbyloxy-sym-triazine prepared as described above is added to the paper pulp in the blending engine or in a Jordan machine and thoroughly mixed with the pulp, or the substituted halo-triazine compound may be incorporated by applying as a water dispersion at the machine head box. The pulp is then sheeted on a screen, as in a Fourdrinier machine, dried and calendered at elevated temperatures and the resulting paper is found to have excellent and permanent water repellant properties. Other methods of application of the substituted symmetrical halotriazine may be carried out by e.g., spraying a water dispersion of the substituted halotriazine on the paper web while it is being formed but before drying. Or it may be applied as a tub-size to the dry finished paper by immersion in a bath containing the dispersion, followed by subsequent drying and calendering at elevated temperatures.

A particular advantage of the presently provided compounds in sizing compositions is that they are active in alkaline pulp paper-making processes and provide cross-linking of the paper stock to which they are added, thus providing increased wet and dry strength to the papers. Papers made from alkaline pulp materials are more stable, retain color and strength longer than acid sized, i.e., rosin sized papers made with alum, which is always used with rosin.

In testing the efficiency of a paper size, a common test which is applied is as follows: A paper dish is made by folding a small square of paper into a boat-like form which is then floated upon an ordinary liquid writing ink. The time necessary for the physical penetration of the ink through the paper boat is noted. Treated papers which have, when tested by this method, the longest interval between floating and the appearance of ink on the inside of the boat are considered the most efficient. For ordinary purposes the paper is considered satisfactory if the time of penetration is at least 5 minutes.

In the application of my halohydrocarbyloxy-substituted sym-triazines to paper or paper pulp for the manufacture of water repellent papers, a heating or a curing step is generally used. When the paper has been treated in a wet way, as by means of a paper coating machine, it is possible to combine the drying and curing step in one operation. The drying operation may be carried out finally at temperatures of from about 80 to about 150° C. or even higher. Thus by curing paper treated with 0.42% 2,4-dichloro-6-(2-chloro - 3 - octadecyloxypropoxy)-sym-triazine and mixed with triethylenediamine as a catalyst at 105° C. for 90 minutes I have been able to obtain a penetration time of 5,000 seconds. Similarly, paper samples treated with 0.42% of 2,4-dichloro-6-(2-chloro-3-octadecyloxypropoxy)-sym-triazine for 60 minutes at 110° C. gave a time of 3500 seconds. Untreated paper (a control) of the same type showed an instantanous penetration.

The products may be applied to various types of cellulosic pulp fibers such as ground wood, sulfite, soda, kraft or sulfate pulps or even asbestos. In application it is generally sufficient to make an aqueous dispersion of the halohydrocarbyloxy-substituted-sym-triazines in a colloid mill using a dispersing agent mentioned, or by the use of other known wetting agents. The dispersion may be made in concentrated form up to 40% to 50% solids, or in dilute form, say from 1% to 4% solids and the dispersion then added to the pulp in the beater.

This invention thus provides pulp fibers and paper products derived therefrom which have been treated with a sizing agent which does not merely coat the cellulose fibers but reacts with the fibers of the paper to become chemically attached to and a part of the paper product itself. This type of sized paper product is to be distinguished from paper products sized with rosin sizes or other aggregates which merely physically adhere to the surface of the paper. With the reactive chemical sizes provided by this invention, the sizing becomes permanent and more efficient than prior sizing practices. The quantity of the substituted-halo-sym-triazines of this invention which are used in paper applications are generally small, ranging from solutions of from 0.01% to 2% up to 5%, depending on how the compounds are applied. It is generally preferred to provide for treating on the paper pulp with a quantity sufficient to obtain a paper product having up to 1%, preferably from 0.1% to 0.5%, by weight of the active substituted halo-sym-triazine based on the dry pulp.

Because of the pronounced hydrophobic properties of the higher molecular weight halohydrocarbyloxy-substituted halo-sym-triazines already mentioned advantage is taken, to as great an extent as practicable, of mechanical dispersing aids such as mixing devices, colloid mills, and the like. Such dispersion is preferably effected in the presence of a dispersing agent as above mentioned. The aqueous dispersion thereby obtained will contain the halohydrocarbyloxy-substituted halo-sym-triazine and the dispersing agent, in a form of stable compositions.

By the term "paper" as used herein, I mean to include not only ordinary paper but also cardboard or other thicker papers made from one or more plies of paper stock. The invention is further illustrated by but not limited to the following specific examples:

*Example 1*

To 32.7 g. (0.10 mole) of n-octadecyl glycidyl ether there was added 27.6 g. (0.15 mole) of cyanuryl chloride in 50 ml. of acetonitrile. The mixture was stirred and heated to reflux (about 85° C.), and then about 0.5 g. of zinc chloride was added. The mixture was heated and stirred for 20.5 hours. Acetonitrile was removed under aspirator vacuum to about 100° C. The residue was cooled to room temperature and then 100 ml. of hexane was added, with stirring. The excess unreacted cyanuryl chloride (9.0 g.) and zinc chloride were filtered off. The filtrate was heated to 110° C. under aspirator vacuum to remove hexane, leaving a light orange oil. The light orange oil product was purified by removal by sublimation of additional cyanuryl chloride, and redissolving the residue in hexane, treating it with decolorizing charcoal, filtering off the charcoal, and aspirating off the hexane as before, to leave as residue 31.2 g. of 2,4-dichloro-6-(2 - chloro-3-octadecyloxypropoxy)-s-triazine, which analyzed as containing 7.75% nitrogen as compared with 8.22% nitrogen, the calculated value.

*Example 2*

In a 300 ml. bomb reactor there were placed 36.9 g. (0.20 mole) of cyanuryl chloride and 0.5 g. of zinc chloride with 50 ml. of acetonitrile containing 17.5 g. (0.3 mole) of propylene oxide. The bomb was sealed and heated and rocked for approximately 12 hours at 100°–110° C. The bomb reactor was emptied, the contents filtered, and then aspirated to remove asetonitrile. The residue was distilled giving 21.5 g. of 2,4-dichloro-6-(2-chloropropoxy)-s-triazine; $n_D^{25}$ 1.5256.

The above reaction was also run at atmospheric pressure to give 2,4-dichloro-6-(2-chloropropoxy)-sym-triazine, B.P. 114°–118° C./0.2 mm., $n_D^{25}$ 1.5297, analyzing as containing 30.43% carbon, 2.80% hydrogen, 17.28% nitrogen, and 43.43% chlorine as compared with 29.7% carbon, 2.50% hydrogen, 17.33% nitrogen, and 43.8% chlorine, the calculated values for $C_6H_6Cl_3N_3O$.

To 15.3 g. of 2-(2-chloropropoxy)-4,6-dichloro-sym-triazine in benzene there was added sodium methoxide in methanol (7.0 g. of sodium methoxide in 35 ml. of methanol) to convert the product to trimethyl cyanurate; distillation gave propylene oxide as a solution which was collected and analyzed for oxirane content, which indicated that 12.7% yield was isolated.

The benzene was distilled off leaving a slurry which was cooled, filtered, and washed three times with water. Recrystallization from water gave long needle-like crystals, M.P. 133.5°–135° C. The melting point of the trimethyl cyanurate was identical to the melting point of trimethyl cyanurate prepared by another method. The melting point of a mixture of the two products was the same, i.e., 133.5 to 135° C.

*Example 3*

To 210 ml. of a solution of 36.9 g. of cyanuryl chloride in acetonitrile stirred at 70° under a dry ice condenser there was added ethylene oxide entrained in a stream of nitrogen. When 12.8 g. of ethylene oxide had been added, the temperature was 69° in the boiling mixture. When little reaction occurred in 30 min., about 0.1 g. anhydrous zinc chloride was added and, after another 30 min., 0.1 g. anhydrous ferric chloride was added and heating under reflux continued for twenty hours. The solution was concentrated by distillation and the solvent replaced with carbon tetrachloride, from which a total of 24.6 g. (67% recovery) of cyanuryl chloride crystallized in three crops.

The material remaining in solution was distilled in vacuo and the lower boiling material redistilled, mainly at 102–104°/0.1 mm., $n_D^{25}$ 1.5404. Analysis showed it to contain 26.78% carbon, 2.09% hydrogen, 17.78% nitrogen and 47.51% chlorine compared to the values calculated for 2,4-dichloro - 6-(2-chloroethoxy) - sym-triazine of 26.3% carbon, 1.76% hydrogen, 18.4% nitrogen and 46.5% chlorine.

From the first distillation, a fraction boiling at 134–195° (dec.)/0.3–0.5 mm. crystallized and recrystallization from dioxane and then three times from carbon tetrachloride gave colorless crystals, M.P. 109.5–111°, containing 33.51% carbon, 3.16% hydrogen, 22.11% nitrogen, and 28.04% chlorine corresponding to 33.5% carbon, 3.21% hydrogen, 22.3% nitrogen and 28.3% chlorine calculated for $C_7H_8Cl_2N_4O_2$.

The substituted-halo-sym-triazines are particularly useful as sizing agents for paper, but are also good water proofing agents for cotton and other textiles.

Reasonable variations and modification of the invention as described are to be expected, the essence of which is there have been provided (1) methods for preparing substituted halo-sym-triazine compounds from either glycidyl ether derivatives or epoxyalkanes and trihalo-sym-triazines, (2) said substituted halo-sym-triazines as new compounds, (3) new sizing compositions containing as essential active ingredient one or more of said substituted halo-sym-triazines, (4) and methods for increasing the water repellent characteristics of paper products by incorporating therein a substituted halo-sym-triazine compound.

What is claimed is:

1. A method of increasing the water-repellant characteristics of paper which comprises mixing with the paper pulp which is to be used for making said paper, a composition comprising a dispersing agent, and from 0.01% up to 5%, by weight, based on the dry pulp, of a compound having a formula selected from the group consisting of

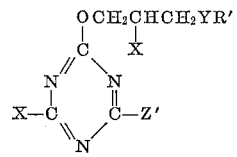

and

wherein R is selected from the group consisting of alkyl radicals having from 10 to 22 carbon atoms, and alkaryl and aralkyl radicals having from 10 to 24 carbon atoms, X is selected from the group consisting of chlorine and bromine; Z is selected from the group consisting of X and the radical

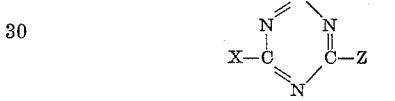

wherein X and R are as defined above; R' is selected from the group consisting of alkyl radicals having from 10 to 22 carbon atoms and alkaryl and aralkyl radicals having from 9 to 24 carbon atoms; Y is a chalkogen element having an atomic weight of from 16 to 33; Z' is selected from the group consisting of X and the radical

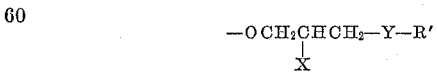

wherein X, Y, and R' are as defined above, and forming the treated paper pulp thus obtained into paper.

2. A method for increasing the water repellant characteristics of paper which comprises mixing with the paper pulp which is to be used for making said paper, from 0.01% up to 5%, by weight based on the dry pulp, of a composition comprising a dispersing agent, and as an essential active ingredient a 2,4-dichloro-6-(2-chloro-3-alkoxypropoxy)-sym-triazine having from 12 to 24 carbon atoms in said 2-chloro-3-alkoxypropoxyl radical.

3. A method as described in claim 2 wherein the 2,4-dichloro-6-(2-chloro-3-alkoxypropoxy)-sym-triazine having from 12 to 24 carbon atoms in said 2-chloro-3-alkoxypropoxyl radical is 2,4-dichloro-6-(2-chloro-3-octadecyloxypropoxy)-sym-triazine.

References Cited by the Examiner

UNITED STATES PATENTS

| | | | |
|---|---|---|---|
| 2,381,121 | 8/45 | Ericks | 260—248 |
| 2,414,289 | 1/47 | Ericks | 260—248 X |
| 2,429,679 | 10/47 | Georges | 106—176 |
| 2,741,606 | 4/56 | Holt et al. | 260—248 |
| 2,809,942 | 10/57 | Cooke | 260—248 |
| 3,050,437 | 8/62 | Arlt | 162—158 |

FOREIGN PATENTS

| | | |
|---|---|---|
| 835,850 | 5/60 | Great Britain. |
| 846,765 | 8/60 | Great Britain. |

OTHER REFERENCES

Koopman: Doctoral Thesis, "Nieuwe Herbicide 1,3,5-Triazine Derivaten," pp. 15 to 22 and 58 to 62, published May 31, 1957, in Holland. (Photostat of original available in Div. 6.)

DONALL H. SYLVESTER, *Primary Examiner.*

DUVAL T. McCUTCHEN, *Examiner.*